(12) United States Patent
Sawakawa et al.

(10) Patent No.: US 12,257,717 B2
(45) Date of Patent: Mar. 25, 2025

(54) MULTI-JOINT-ROBOT LINEAR-MEMBER-SHAPE SIMULATOR, MULTI-JOINT-ROBOT LINEAR-MEMBER-SHAPE SIMULATION METHOD, AND MULTI-JOINT-ROBOT LINEAR-MEMBER-SHAPE SIMULATION PROGRAM

(71) Applicant: Kabushiki Kaisha Kobe Seiko Sho (Kobe Steel, Ltd.), Kobe (JP)

(72) Inventors: Fumiaki Sawakawa, Kobe (JP); Masatoshi Hida, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 359 days.

(21) Appl. No.: 17/656,289

(22) Filed: Mar. 24, 2022

(65) Prior Publication Data
US 2022/0331958 A1    Oct. 20, 2022

(30) Foreign Application Priority Data

Apr. 15, 2021    (JP) ................................. 2021-068897

(51) Int. Cl.
*B25J 9/16*    (2006.01)
*B25J 9/12*    (2006.01)

(52) U.S. Cl.
CPC ............. *B25J 9/1664* (2013.01); *B25J 9/123* (2013.01)

(58) Field of Classification Search
CPC ........ B25J 9/123; B25J 9/1664; B25J 9/1671; B25J 19/00; B25J 9/1656;
(Continued)

(56) References Cited

U.S. PATENT DOCUMENTS

| 7,395,179 B2 * | 7/2008 | Sawai ..................... G06F 30/20 702/42 |
| 11,886,174 B2 * | 1/2024 | Pathre .............. G05B 19/41815 |

FOREIGN PATENT DOCUMENTS

| CN | 102323747 A  * | 1/2012 |
| JP | 07-182017 A  | 7/1995 |

(Continued)

OTHER PUBLICATIONS

Hashima, M, "Real-Time Deformation Simulation and a Design Support System for Wire Harnesses." Proceedings of the ASME 2006 International Design Engineering Technical Conferences and Computers and Information in Engineering Conference. vol. 3: 26th Computers and Information in Engineering Conference (Year: 2006).*

(Continued)

*Primary Examiner* — Adam R Mott
*Assistant Examiner* — James Miller Watts, III
(74) *Attorney, Agent, or Firm* — Oblon, McClelland, Maier & Neustadt, L.L.P.

(57) ABSTRACT

A multi-joint-robot linear-member-shape simulator receives a position of at least one via point via which the linear member extends between a start-point position and an end-point position, an initial position of an adjustment via point that adjusts a length of the linear member, and an adjustment parameter of the adjustment via point, and repeatedly executes shape control for determining the shape of the linear member and a length adjustment for determining the length of the linear member when the linear member has the determined shape by using the input position of the via point and the input initial position of the adjustment via point as an initial value until a difference between an actual length of the linear member and the determined length thereof becomes smaller than or equal to a permissible
(Continued)

value. When the shape control is to be executed, the adjustment parameter is changed.

20 Claims, 6 Drawing Sheets

(58) Field of Classification Search
CPC .......... G05B 2219/39194; G05B 17/00; G06F 2113/16; G06F 30/20; G06F 2111/04; G06F 2119/14; G06G 7/62
See application file for complete search history.

(56) References Cited

FOREIGN PATENT DOCUMENTS

| | | | |
|---|---|---|---|
| JP | 10-275007 A | | 10/1998 |
| JP | H10275007 A | * | 10/1998 |
| JP | 2993341 B2 | * | 12/1999 |
| JP | 2004-074368 A | | 3/2004 |
| JP | 2004362191 A | * | 12/2004 |
| WO | WO-2022137581 A1 | * | 6/2022 .............. B25J 19/00 |

OTHER PUBLICATIONS

Translation of JP_2004362191_A (Year: 2004).*
Translation of JP_2993341_B2 (Year: 1999).*
Translation of JP_H10275007_A (Year: 1998).*

* cited by examiner

MULTI-JOINT-ROBOT LINEAR-MEMBER-SHAPE SIMULATOR, MULTI-JOINT-ROBOT LINEAR-MEMBER-SHAPE SIMULATION METHOD, AND MULTI-JOINT-ROBOT LINEAR-MEMBER-SHAPE SIMULATION PROGRAM

BACKGROUND OF THE INVENTION

1. Field of the Invention

The present invention relates to multi-joint-robot linear-member-shape simulators, multi-joint-robot linear-member-shape simulation methods, and multi-joint-robot linear-member-shape simulation programs that determine the shape of linear members attached to multi-joint robots.

2. Description of the Related Art

With the development of multi-joint robots, such as vertical six-axis robots, such multi-joint robots are being widely used in various industrial fields. Multi-joint robots of this type operate in accordance with operation data (operation program or teaching program) about a movement preliminarily taught in accordance with the operational purpose. A frequently-used teaching method is a so-called offline teaching method since the operation program can be created without stopping the multi-joint robot in operation. This offline teaching method involves creating an operation program by reproducing an actual robot in real space as a virtual robot model in a virtual space of a computer and causing this virtual robot model to simulate the movement of the actual robot so as to check the movement of the actual robot.

The multi-joint robot has a tool attached to the distal end of an arm in accordance with the intended usage, and may sometimes be equipped with a linear member, such as a cable for feeding electricity to the tool, a tube for supplying a raw material to the tool, or a wire of the raw material. Therefore, in the offline teaching method, it is also necessary to simulate the state of such a linear member. Japanese Unexamined Patent Application Publication Nos. 07-182017 and 2004-074368 disclose examples of such an offline teaching method.

A linear-member simulation method disclosed in Japanese Unexamined Patent Application Publication No. 07-182017 involves recognizing the coordinates of a plurality of stationary points supporting a linear member attached to a robot, tangent vectors at the stationary points, and the length of the linear member between neighboring stationary points, performing a conversion on the coordinate positions between the stationary points and the tangent vectors based on a movement amount of a movable section of the robot, calculating a coefficient of a curve function expressing the shape of the linear member between the neighboring stationary points based on the values of the converted coordinate positions between the stationary points and the tangent vectors and the length of the linear member between the neighboring stationary points, and predicting deformation of the attached linear member occurring as a result of the linear member following the movement of the robot.

Japanese Unexamined Patent Application Publication No. 2004-074368 discloses a cable display device in a robot offline teaching system that displays, on a screen, a robot equipped with an arm and a hand attached to the distal end of the arm and that teaches the robot about a predetermined movement by manipulating the robot on the screen. The cable display device includes a cable state detector that detects a torsional state of a cable attached to the robot or a twisted state of the cable around the arm, and also includes an image renderer that renders an image of the cable state detected by the cable state detector on the screen. The cable state detector detects the torsional state or the twisted state of the cable based on a total rotational angle of the arm and/or the hand around an axis and attachment angles of fixed sections at a base end and a distal end of the cable.

SUMMARY OF THE INVENTION

In the linear-member simulation method disclosed in Japanese Unexamined Patent Application Publication No. 07-182017, the shape of the linear member is approximated with a cubic curve from two positions and tangent vectors thereof and is displayed. With the two positions and the tangent vectors thereof, it is difficult to express a complex shape, such as a twisted shape of a cable, by using an approximate curve.

On the other hand, with the cable display device in the robot offline teaching system disclosed in Japanese Unexamined Patent Application Publication No. 2004-074368, the cable is image-rendered on the screen by using a group of dots (spheres) arranged continuously in a circular arc pattern to surround an upper arm, as indicated in paragraph [0023] and FIG. 5(b). With such a group of dots, it is not possible to determine the shape of the cable twisted around, for example, the arm. Thus, it is difficult to intuitively correct the teaching operation (operation program) in view of the shape of the cable.

The present invention has been made in view of the circumstances described above, and an object thereof is to provide a multi-joint-robot linear-member-shape simulator, a multi-joint-robot linear-member-shape simulation method, and a multi-joint-robot linear-member-shape simulation program that can determine the shape of a linear member based on an approximate curve even if the linear member has a more complex shape.

As a result of various studies, the present inventor has discovered that the aforementioned object can be achieved in accordance with the present invention below. Specifically, a multi-joint-robot linear-member-shape simulator according to an aspect of the present invention is a multi-joint-robot linear-member-shape simulator that determines a shape of a linear member attached to a multi-joint robot when the multi-joint robot is in a predetermined posture. The multi-joint-robot linear-member-shape simulator includes: an input unit that receives a position of at least one via point via which the linear member extends between a start-point position and an end-point position of the linear member, an initial position of an adjustment via point via which the linear member extends and that adjusts a length of the linear member, and an adjustment parameter of the adjustment via point; a shape control function that executes shape control for determining the shape of the linear member; a length adjustment unit that executes a length adjustment for determining the length of the linear member when the linear member has the shape determined by the shape control function; and a shape setting unit that executes the shape control and the length adjustment in repetition cycles by using the position of the via point input to the input unit and the initial position of the adjustment via point input to the input unit as an initial value until a difference between an actual length of the linear member and the length of the linear member determined by the length adjustment function becomes smaller than or equal to a permissible value. The shape setting unit changes the adjustment parameter when the shape control is to be executed.

This multi-joint-robot linear-member-shape simulator can set at least one via point via which the linear member extends between the start-point position and the end-point position of the linear member, so that a linear member with a more complex shape, such as a twisted shape, can be expressed. Accordingly, the multi-joint-robot linear-member-shape simulator described above can determine the shape of the linear member based on an approximate curve even if the linear member has a more complex shape.

In the multi-joint-robot linear-member-shape simulator according to the above aspect, the adjustment parameter may include a movement amount corresponding to one cycle in the repetition cycles and a movement direction.

Because the multi-joint-robot linear-member-shape simulator has the movement amount corresponding to one cycle in the repetition cycles and the movement direction as adjustment parameters, for example, a linear member with a bent shape can be expressed in view of curling of the linear member. Therefore, with the multi-joint-robot linear-member-shape simulator described above, the shape of the linear member can be determined based on an approximate curve in view of, for example, bending caused by curling of the linear member.

In the multi-joint-robot linear-member-shape simulator according to the above aspect, the via point may include a point at which the linear member is twisted around an arm of the multi-joint robot.

Accordingly, a multi-joint-robot linear-member-shape simulator that can determine the shape of a linear member twisted around an arm of a multi-joint robot based on an approximate curve can be provided.

In the multi-joint-robot linear-member-shape simulator according to the above aspect, the shape setting unit may change the end-point position of the linear member if the length of the linear member determined by the length adjustment function is greater than the actual length of the linear member. Preferably, in the multi-joint-robot linear-member-shape simulator described above, the shape setting unit may change the end-point position of the linear member in a predetermined changing direction by a predetermined change amount within a predetermined range.

Since the multi-joint-robot linear-member-shape simulator changes the end-point position of the linear member when executing shape control, the multi-joint-robot linear-member-shape simulator can determine the shape of the linear member based on an approximate curve in view of, for example, a device (equipment), such as a tool balancer, for adjusting the end-point position of the linear member.

In the multi-joint-robot linear-member-shape simulator according to the above aspect, the shape control function may determine the shape of the linear member based on the start-point position, a vector at the start-point position, the end-point position, a vector at the end-point position, a position of the via point, a vector at the position of the via point, a position of the adjustment via point, and a vector at the position of the adjustment via point.

The multi-joint-robot linear-member-shape simulator can determine the shape of the linear member based on an approximate curve in view of the rigidity of the linear member by adjusting the magnitude of the vectors.

A multi-joint-robot linear-member-shape simulation method according to another aspect of the present invention is a multi-joint-robot linear-member-shape simulation method for determining a shape of a linear member attached to a multi-joint robot when the multi-joint robot is in a predetermined posture. The method includes: an input stop for receiving a position of at least one via point via which the linear member extends between a start-point position and an end-point position of the linear member, an initial position of an adjustment via point via which the linear member extends and that adjusts a length of the linear member, and an adjustment parameter of the adjustment via point; a shape control step for determining the shape of the linear member; a length adjustment step for determining the length of the linear member when the linear member has the shape determined in the shape control step; and a shape setting step for executing the shape control step and the length adjustment step in repetition cycles by using the position of the via point input in the input step and the initial position of the adjustment via point input in the input step as an initial value until a difference between an actual length of the linear member and the length of the linear member determined in the length adjustment step becomes smaller than or equal to a permissible value. The shape setting step includes changing the adjustment parameter when the shape control step is to be executed.

A multi-joint-robot linear-member-shape simulation program according to another aspect of the present invention is a multi-joint-robot linear-member-shape simulation program for determining a shape of a linear member attached to a multi-joint robot when the multi-joint robot is in a predetermined posture. The program causes a computer to execute a process including: an input step for receiving a position of at least one via point via which the linear member extends between a start-point position and an end-point position of the linear member, an initial position of an adjustment via point via which the linear member extends and that adjusts a length of the linear member, and an adjustment parameter of the adjustment via point; a shape control step for determining the shape of the linear member; a length adjustment step for determining the length of the linear member when the linear member has the shape determined in the shape control step; and a shape setting step for executing the shape control step and the length adjustment step in repetition cycles by using the position of the via point input in the input step and the initial position of the adjustment via point input in the input step as an initial value until a difference between an actual length of the linear member and the length of the linear member determined in the length adjustment step becomes smaller than or equal to a permissible value. The shape setting step includes changing the adjustment parameter when the shape control step is to be executed.

The multi-joint-robot linear-member-shape simulation method and program can set at least one via point via which the linear member extends between the start-point position and the end-point position of the linear member, so that a linear member with a more complex shape, such as a twisted shape, can be expressed. Accordingly, the multi-joint-robot linear-member-shape simulation method and program described above can determine the shape of the linear member based on an approximate curve even if the linear member has a more complex shape.

The multi-joint-robot linear-member-shape simulator, the multi-joint-robot linear-member-shape simulation method, and the multi-joint-robot linear-member-shape simulation program according to the present invention can determine the shape of a linear member based on an approximate curve even if the linear member has a more complex shape.

DESCRIPTION OF THE PREFERRED EMBODIMENTS

Figure 1A:
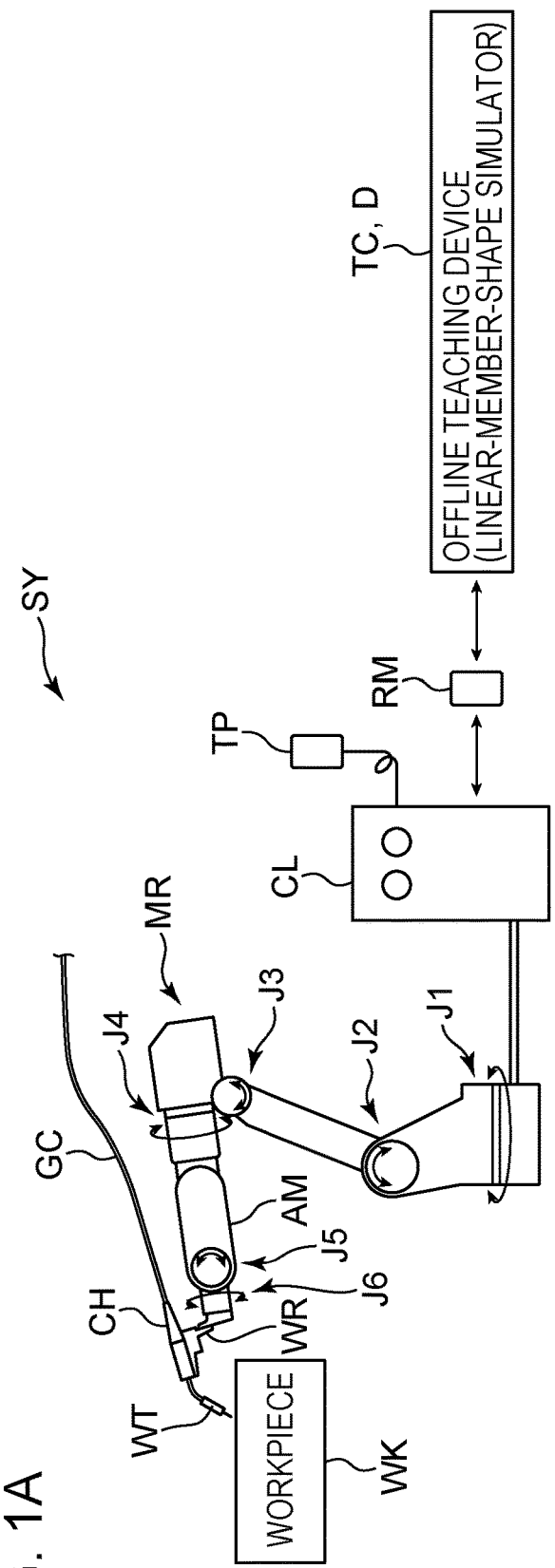
FIGS. 1A to 1C schematically illustrate the configuration of a welding system equipped with a multi-joint-robot linear-member-shape simulator according to an embodiment.

One or more embodiments of the present invention will be described below with reference to the drawings. However, the scope of the invention is not limited to the disclosed one or more embodiments. Components given the same reference signs in the drawings indicate that they are the same components, and descriptions thereof will be omitted, where appropriate. In this description, when collectively referring to objects, such objects will be indicated by using reference signs without subscripts, whereas when individually referring to objects, such objects will be indicated by using reference signs with subscripts.

A multi-joint-robot linear-member-shape simulator according to an embodiment is a device that determines the shape of a linear member attached to a multi-joint robot when the multi-joint robot is in a predetermined posture. The linear member is a member that extends linearly and longitudinally in one direction, and may be any member so long as the member can change its shape. For example, the linear member may be a cable for feeding electricity to a tool attached to the distal end of an arm in accordance with the intended usage, a tube for supplying a raw material to the tool, or a wire of the raw material. The multi-joint-robot linear-member-shape simulator includes: an input unit that receives a position of at least one via point via which the linear member extends between a start-point position and an end-point position of the linear member, an initial position of an adjustment via point via which the linear member extends and that adjusts a length of the linear member, and an adjustment parameter of the adjustment via point; a shape control function that executes shape control for determining the shape of the linear member; a length adjustment function that executes a length adjustment for determining the length of the linear member when the linear member has the shape determined by the shape control function; and a shape setting unit that executes the shape control and the length adjustment in repetition cycles by using the position of the via point input to the input unit and the initial position of the adjustment via point input to the input unit as an initial value until a difference between an actual length of the linear member and the length of the linear member determined by the length adjustment function becomes smaller than or equal to a permissible value. The shape setting unit changes the adjustment parameter when the shape control is to be executed. The multi-joint-robot linear-member-shape simulator, as well as a multi-joint-robot linear-member-shape simulation method and a multi-joint-robot linear-member-shape simulation program that are implemented in the multi-joint-robot linear-member-shape simulator, will be described in further detail below with reference to an example where they are applied to a welding system. The multi-joint-robot linear-member-shape simulator, the method, and the program are not limited to a case where they are applied to a welding system, and may be applied to any system that uses a multi-joint robot having the linear member attached thereto.

Figure 1C:
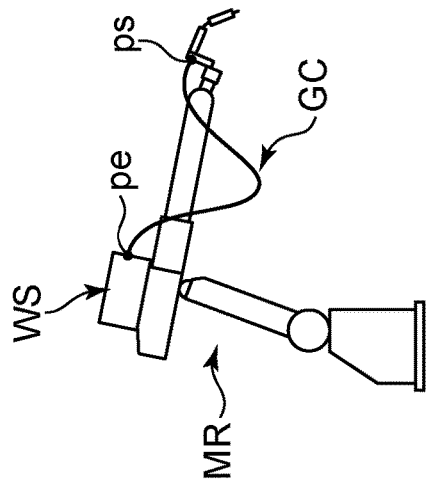
Figure 1B:
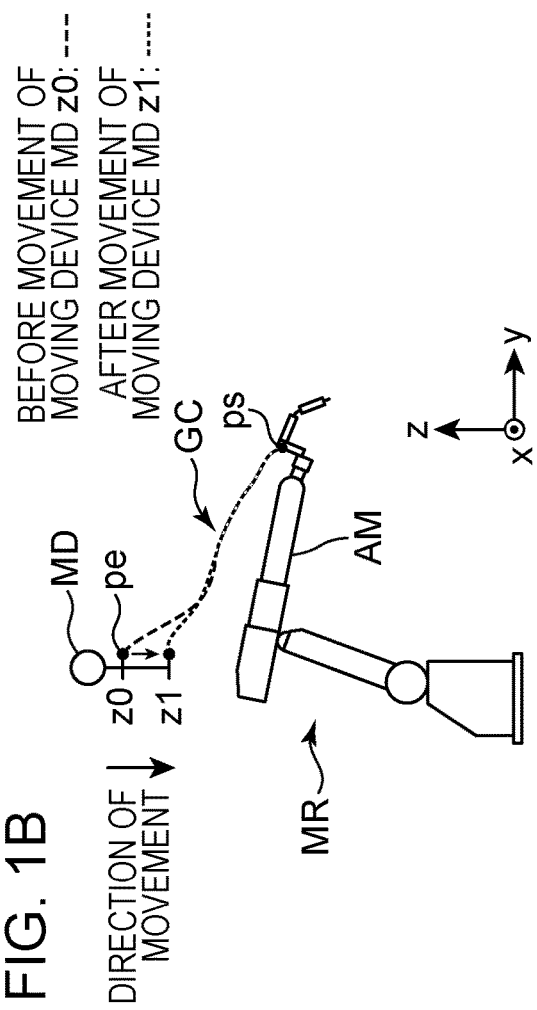
Figure 2:
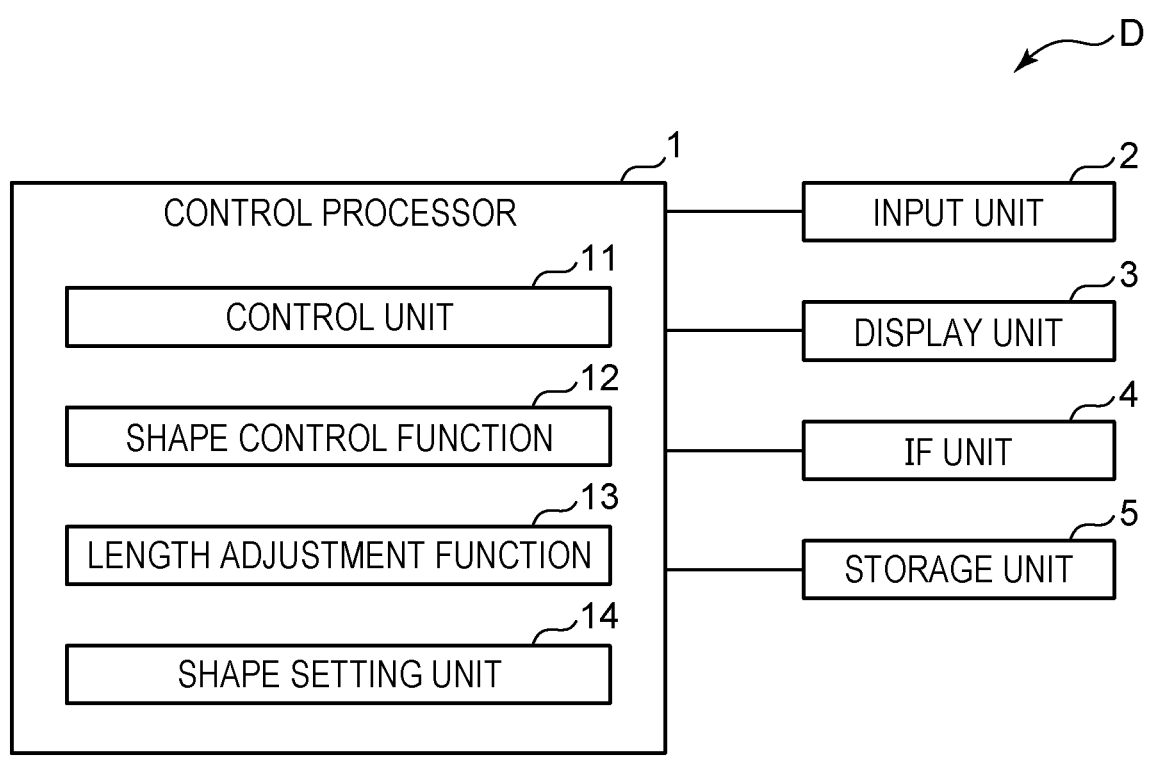
FIG. 2 is a block diagram illustrating the configuration of the multi-joint-robot linear-member-shape simulator.
Figure 3:
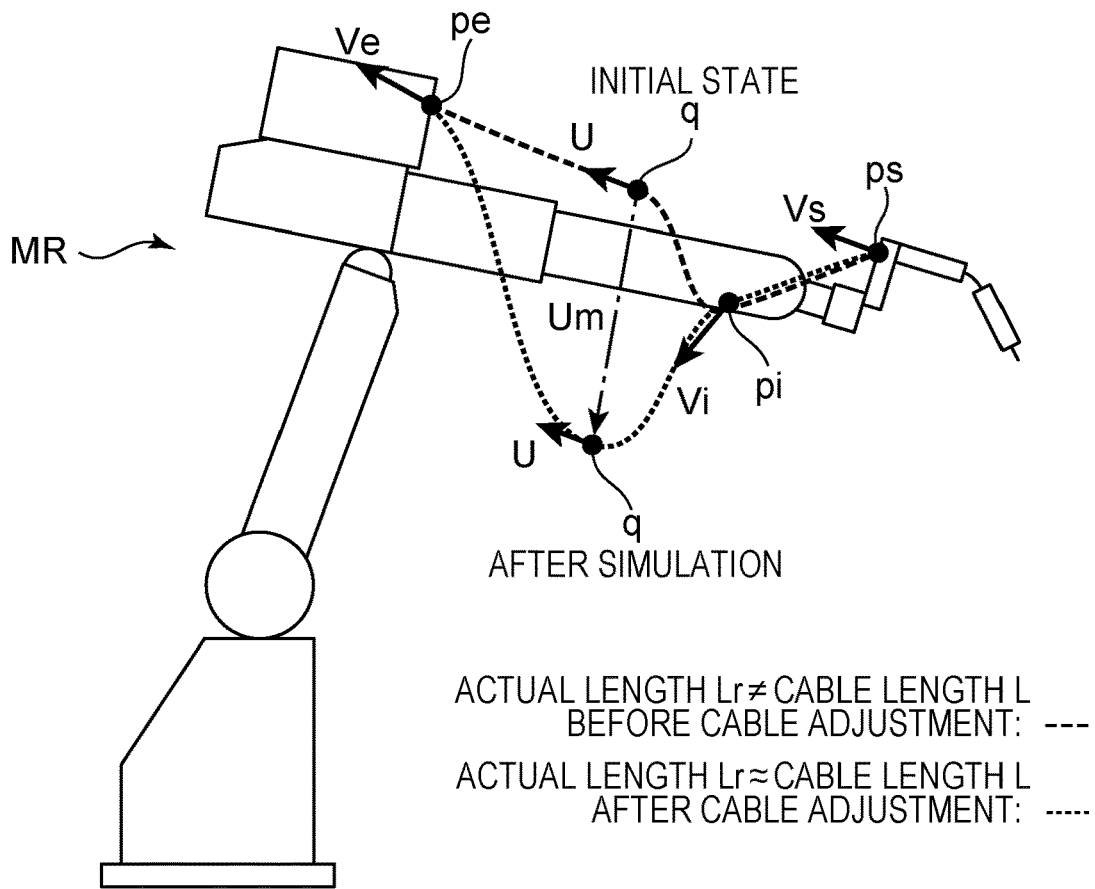
FIG. 3 illustrates various points of a guide cable as an example of a linear member.
Figure 4:
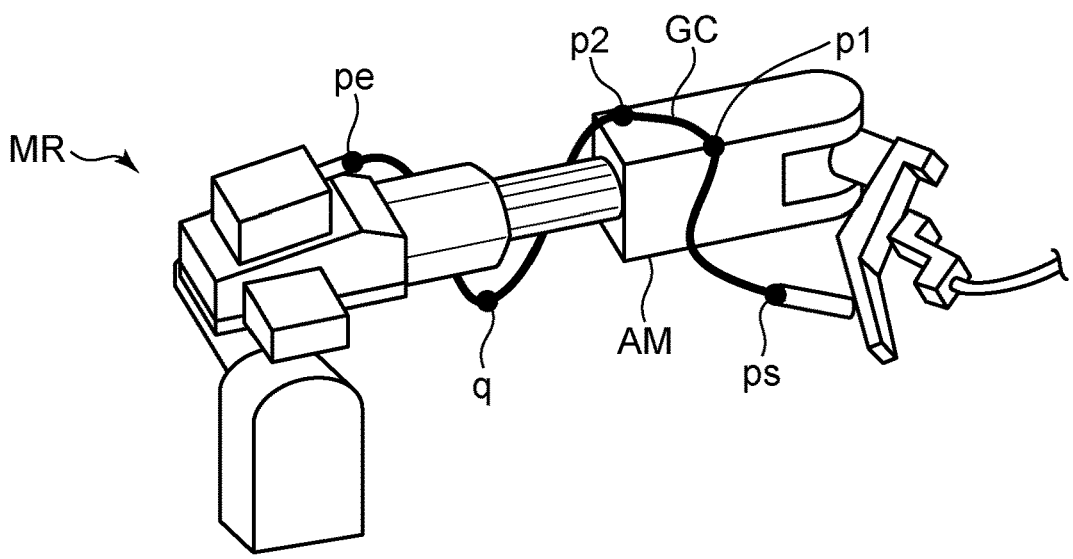
FIG. 4 illustrates an example where via points are set such that the guide cable is twisted around an arm.
Figure 5A:
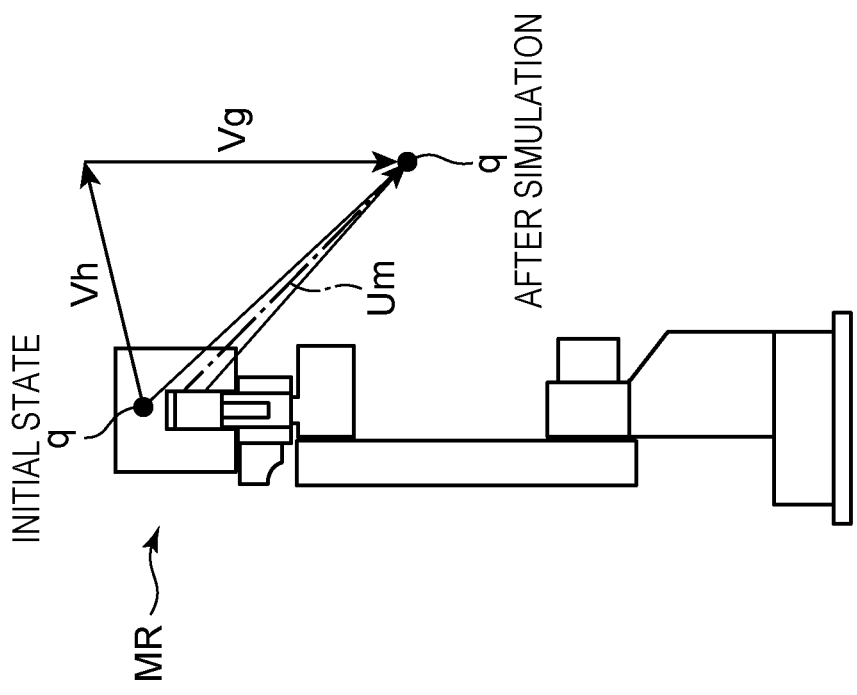
FIGS. 5A and 5B illustrate the direction of movement of an adjustment via point in view of curling of the guide cable.
Figure 5B:
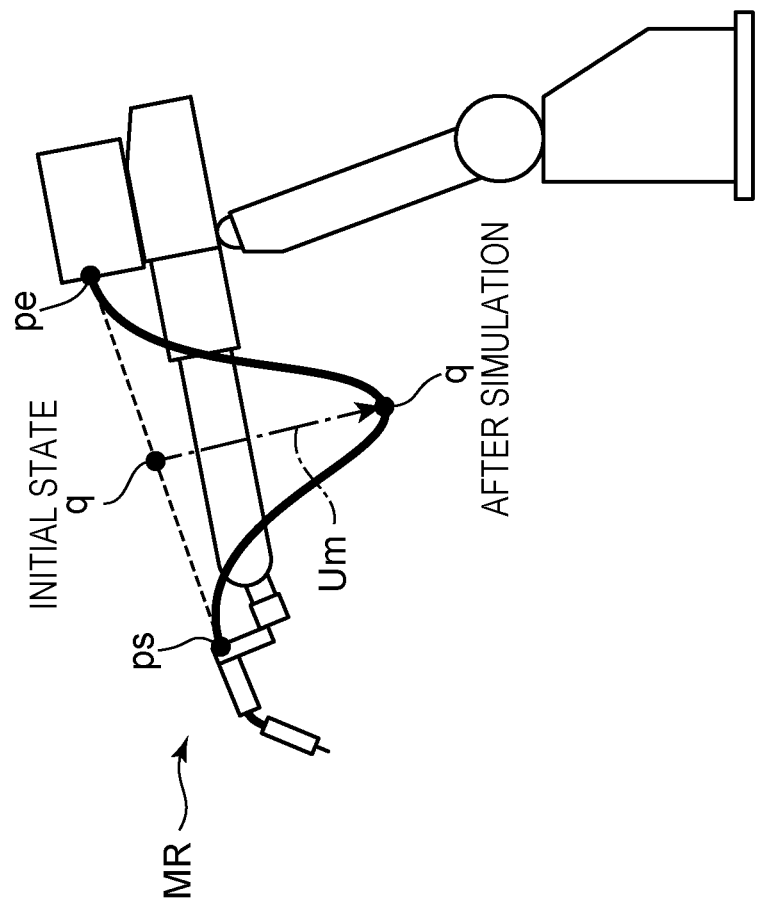

FIGS. 1A to 1C schematically illustrate the configuration of a welding system equipped with the multi-joint-robot linear-member-shape simulator according to the embodiment. FIG. 1A illustrates the overall configuration, FIG. 1B illustrates a case where a moving device is provided, and FIG. 1C illustrates a case where an arm is provided with a wire supplier WS. FIG. 2 is a block diagram illustrating the configuration of the multi-joint-robot linear-member-shape simulator. FIG. 3 illustrates various points of a guide cable as an example of the linear member. In FIG. 3, the shape of the guide cable in an initial state prior to simulation is denoted by a relatively long dashed line, and the shape of the guide cable after simulation is denoted by a relatively short dashed line. FIG. 4 illustrates an example where via points are set such that the guide cable is twisted around the arm. FIGS. 5A and 5B illustrate the direction of movement of an adjustment via point in view of curling of the guide cable. FIG. 5A is a side view, and FIG. 5B is a front view.

As shown in FIG. 1A, for example, a welding system SY equipped with the multi-joint-robot linear-member-shape simulator according to the embodiment includes a multi-joint robot MR, a controller CL, a teaching pendant TP, and an offline teaching device TC.

The multi-joint robot MR is connected to the controller CL, operates by being controlled by the controller CL, and includes an arm AM having a plurality of joints. For example, the multi-joint robot MR is a vertical six-axis robot with six degrees of freedom by having six joints, namely, first to sixth joints J1 to J6. A wrist WR at the distal end of the arm AM is provided with a welding torch WT as an example of a tool in this embodiment, so that the multi-joint robot MR can weld a workpiece WK by arc welding using a welding wire fed from the welding torch WT. A guide cable GC is a tubular member (hollow member) that is long in one direction and guides the welding wire. The welding wire is guided to the welding torch WT by extending through the guide cable GC, so as to be supplied to the welding torch WT. A first end of the guide cable CC is supported by being held by a cable holder CH set at the wrist WR. For example, as shown in FIG. 1C, a second end of the guide cable GC may be supported by the wire supplier WS that is set at an upper section of the arm AM located at an end opposite the distal end and near the fourth joint J4 and that supplies the welding wire. In this embodiment, for example, as shown in FIG. 1B, the second end of the guide cable GC is supported by a moving device MD disposed at a predetermined position above the multi-joint robot MR. The moving device MD includes, for example, a tool balancer and changes the position of the second end of the guide cable GC by moving the second end of the guide cable GC in a predetermined movement direction, such as the vertical direction (z direction), within a predetermined range. By moving the second end of the guide cable GC downward (−z direction) from a predetermined reference position (z0) to a position (z1), the second end of the guide cable GC is positionally set close to the arm AM of the multi-joint robot MR, whereby the movable range of the guide cable GC can be changed. The guide cable GC is an example of a linear member attached to a multi-joint robot.

The teaching pendant TP is a handheld operation device connected to the controller CL and provided for manually operating the multi-joint robot MR. Teaching the multi-joint robot MR about a movement by using the teaching pendant TP involves causing the multi-joint robot MR to actually move in accordance with a manual operation, thereby teaching the multi-joint robot MR about, for example, the movement path and the position of the welding torch WT relative to the workpiece WK.

The offline teaching device TC reproduces the multi-joint robot MR as a virtual robot model in a virtual space of a computer and causes this virtual robot model to simulate the movement of the multi-joint robot MR, so as to create operation data (operation program or teaching program) for causing the multi-joint robot MR to move in accordance with the operational purpose. The operation data created by the offline teaching device TC is, for example, recorded (or stored) in a recording medium (or a storage medium) that records (or stores) data, is read by the controller CL from this recording medium, and is stored in the controller CL. The recording medium (or the storage medium) is, for example, a flexible disk, a CD-R (compact disc recordable), a DVD-R (digital versatile disc recordable), a USB (universal serial bus) memory, or an SD card (registered trademark). Alternatively, the offline teaching device TC and the controller CL may be connected in a communicable manner so that the operation data may be transmitted from the offline teaching device TC to the controller CL by data communication and be stored in the controller CL.

A multi-joint-robot linear-member-shape simulator D according to an embodiment is provided in, for example, the offline teaching device TC in this embodiment.

The controller CL controls the multi-joint robot MR in accordance with the operation data (operation program or teaching program) created by the teaching pendant TP or the offline teaching device TC preliminarily teaching the multi-joint robot MR, and causes the welding torch WT to weld the workpiece WK.

For example, as shown in FIG. 2, the multi-joint-robot linear-member-shape simulator D according to the embodiment provided in the offline teaching device TC includes a control processor 1, an input unit 2, a display unit 3, an interface (IF) unit 4, and a storage unit 5.

The input unit 2 is connected to the control processor 1 and is used for inputting various types of commands, such as a command for starting a teaching operation, and various types of data to the linear-member-shape simulator D (offline teaching device TC). The various types of data are required for causing the linear-member-shape simulator D (offline teaching device TC) to operate and include the name of operation data and information indicating whether or not the moving device MD is present. The input unit 2 includes, for example, a plurality of input switches to which predetermined functions are allocated, a keyboard, and a mouse.

For example, as shown in FIG. 3, in this embodiment, the input unit 2 receives a position (start-point position) Ps of a start point ps of the guide cable GC as an example of the linear member and a start-point vector Vs thereof when the multi-joint robot MR is in a predetermined first posture, a position (end-point position) Pe of an end point pe of the guide cable GC in the initial posture and an end-point vector Ve thereof, and an actual length Lr of the guide cable GC. The start-point vector Vs indicates a tangential direction at the start-point position Ps on a curve expressing the shape of the guide cable GC. The end-point vector Ve indicates a tangential direction at the end-point position Pe on the curve expressing the shape of the guide cable GC.

Furthermore, for example, as shown in FIG. 3, the input unit 2 receives a position (via-point position) Pi of at least one via point pi via which the guide cable GC extends between the start-point position Ps of the start point ps and the end-point position Pe of the end point pe, an initial position of a position (adjustment-via-point position) Q of an adjustment via point q via which the guide cable GC extends and that adjusts a length L of the guide cable GC, and an adjustment parameter of the adjustment via point q (i=1, 2, 3, . . . ). In FIG. 3, Vi denotes a vector (via-point vector) at the via point pi, and U denotes a vector (adjustment-via-point vector) at the adjustment via point q.

When the via point pi is to be set, for example, as shown in FIG. 4, via points p1 and p2 may be set such that the guide cable GC is twisted around the arm AM. Accordingly, the guide cable GC with a more complex shape, such as a twisted shape, can be expressed. The guide cable GC does not necessarily have to be twisted around the full circumference of the arm AM, and may be twisted partially around the arm AM. In the example shown in FIG. 4, the guide cable GC is twisted about halfway around the arm AM.

For example, in this embodiment, the adjustment parameter of the adjustment via point q includes a movement amount ΔM corresponding to one cycle in repetition cycles of shape control and a length adjustment for determining the shape of the guide cable GC, and also includes a movement direction Um. The movement amount ΔM corresponding to one cycle is preliminarily set to an appropriate value. The movement direction Um may be set arbitrarily, but may be set in view of curling of the guide cable GC so that, for example, the guide cable GC with a bent shape can be expressed in view of the curling. For example, as shown in FIG. 5B, if the guide cable GC curls toward the upper right side in plan view of the drawing, a vector (curl vector) Vh indicating the direction of this curl is set, and the movement direction Um is set as a direction of a composite vector of the curl vector Vh and a vector (gravitational-force vector) Vg of the gravitational force.

The display unit 3 is connected to the control processor 1 and displays, for example, a command or data input from the input unit 2, as well as the virtual robot model (including the guide cable GC) in the virtual space generated by the offline teaching device TC (linear-member-shape simulator D), by being controlled by the control processor 1. Examples of the display unit 3 include a cathode-ray-tube (CRT) display, a liquid crystal display (LCD), and an organic electroluminescence (EL) display.

The input unit 2 and the display unit 3 may be constituted of a touchscreen. If a touchscreen is used, the input unit 2 is, for example, a position input device that detects an operated position based on a resistive film method or a capacitance method to receive the operated position. In this touchscreen, the position input device is provided on the display surface of the display unit 3, and the display unit 3 displays one or more inputtable content candidates. When a user touches the display position displaying the inputtable content that the user desires to input, the position input device detects the position, and the display content displayed at the detected position is input as the user's operational input content to the linear-member-shape simulator D (offline teaching device TC). With such a touchscreen, the user can intuitively and easily comprehend the input operation, so that a user-friendly linear-member-shape simulator D (offline teaching device TC) can be provided.

The IF unit 4 is a circuit connected to the control processor 1 and, for example, receives and outputs data from and to an external device by being controlled by the control processor 1. Examples of the IF unit 4 include an RS-232C interface circuit using serial communication, an interface circuit using the Bluetooth (registered trademark) standard, and an interface circuit using the USB standard. Alternatively, the IF unit 4 may be a data communication card or a communication interface circuit that exchanges a communication signal with an external device. An example of the communication interface circuit is a communication interface circuit that complies with the IEEE 802.11 standard.

The storage unit 5 is a circuit that is connected to the control processor 1 and that stores various types of predetermined programs and various types of predetermined data by being controlled by the control processor 1. The various types of predetermined programs each include, for example, a control processing program. Examples of the control processing program include a control program for controlling the units 2 to 5 of the linear-member-shape simulator D (offline teaching device TC), a shape control program for executing shape control for determining the shape of the guide cable GC as an example of a linear member, a length adjustment program for executing a length adjustment for determining the length L of the guide cable GC when the guide cable GC has the shape determined in the shape control program, and a shape setting program for executing the shape control and the length adjustment in repetition cycles by using the position Pi of the via point pi input to the input unit 2 and the initial position Q of the adjustment via point q input to the input unit 2 as an initial value until a difference between the actual length Lr of the guide cable GC and the length L of the guide cable GC determined in the length adjustment program becomes smaller than or equal to a permissible value. The various types of predetermined data each include, for example, data required for executing these programs. An example of such data is the aforementioned permissible value. The storage unit 5 includes, for example, a ROM (read-only memory) as a nonvolatile storage element or an EEPROM (electrically erasable programmable read-only memory) as a rewritable nonvolatile storage element. The storage unit 5 also includes, for example, a RAM (random access memory) that serves as a so-called working memory of the control processor 1 and that stores data created during execution of the aforementioned predetermined programs. Moreover, the storage unit 5 may include a hard disk device having a relatively large storage capacity.

The control processor 1 is a circuit that controls the units 2 to 5 of the linear-member-shape simulator D (offline teaching device TC) in accordance with the functions of the individual units, reproduces the multi-joint robot MR as a virtual robot model in a virtual space, causes the virtual robot model to simulate the movement of the multi-joint robot MR so as to create operation data (operation program or teaching program) for causing the multi-joint robot MR to move in accordance with the operational purpose, and determines the shape of the guide cable GC as an example of a linear member attached to the multi-joint robot MR when the multi-joint robot MR is in a predetermined posture. The control processor 1 includes, for example, a CPU (central processing unit) and a peripheral circuit thereof. With execution of the control processing program, the control processor 1 functionally includes a control unit 11, a shape control function 12, a length adjustment function 13, and a shape setting unit 14.

The control unit 11 controls the units 2 to 5 of the linear-member-shape simulator D (offline teaching device TC) in accordance with the functions of the individual units, and is responsible for overall control of the linear-member-shape simulator D (offline teaching device TC).

The shape control function 12 executes shape control involving determining the shape of the guide cable GC as an example of the linear member. More specifically, the shape control function 12 first determines the start-point position Ps, the start-point vector Vs, the end-point position Pe, and the end-point vector Ve of the guide cable GC by so-called forward conversion after the multi-joint robot MR has moved from the first posture to a subsequent predetermined second posture based on the aforementioned operation data. The forward conversion involves the use of a known conventional technique and generally includes determining the position and posture of each link and the position and posture of the distal end of the multi-joint robot MR based on each joint value of the multi-joint robot MR. The shape control function 12 determines the shape of the guide cable GC based on the start-point position Ps, the start-point vector Vs, the end-point position Pe, the end-point vector Ve, the via-point position Pi, the via-point vector Vi, the adjustment-via-point position Q, and the adjustment-via-point vector U. More specifically, for example, as the shape of the guide cable GC, the shape control function 12 determines a spline curve that extends through the positions Ps, Pe, Pi, and Q and whose tangent lines at the positions Ps, Pe, Pi, and Q are aligned with the directions of the vectors Vs, Ve, Vi, and U.

In an xyz Cartesian coordinate system, a spline curve $S_i(t)$ in which $x=f_x(t)$, $y=f_y(t)$, and $z=f_z(t)$, where t is a parameter, is given by Expression 1 indicated below. The positions Ps, Pe, Pi, and Q of the respective points ps, pe, pi, and q through which the guide cable GC extends are given by Expression 2-1 to Expression 2-3 indicated below. If unit vectors at the points ps, pe, pi, and q are each defined as $V_i=(V_{xi}, V_{yi}, V_{zi})$ and the weight of each unit vector is defined as $w_i$, a boundary condition for the spline curve is given by Expression 3 indicated below, whereby coefficients $A_i$, $B_i$, $C_i$, and $D_i$ of the spline curve $S_i(t)$ are determined. In this case, Ws denotes a weight with respect to the start point ps, and We denotes a weight with respect to the end point pe. Although described later in detail in a modification, the weight $w_i$ in this case is preliminarily set to an appropriate value.

$$S_i(t)=(f_{xi}(t), f_{yi}(t), f_{zi}(t))=A_i+B_it+C_it^2+D_it^3 \; t_i \leq t \leq t_i+1 \; (i=1, 2, \ldots, n-1) \quad \text{Expression 1}$$

$$Ps=S_1(t_1), Pe=S_{n-1}(t_n), Pi \text{ or } Q=S_1(t_2), \ldots, S_{n-1}(t_{n-1}) \quad \text{Expression 2}$$

$$S_i(t_{i+1})=S_{i+1}(t_{i+1}), S_i(t_{i+1})'=S_{i+1}(t_{i+1})'=w_{j+1}V_{j+1} (j=1,2 \ldots n-2), S_1(t_1)'=w_1V_1=WsVs, S_{n-1}(t_n)'=w_nV_n=WeVe \quad \text{Expression 3}$$

The length adjustment function 13 executes a length adjustment for determining the length L when the guide cable GC as an example of the linear member has the shape determined by the shape control function 12. The length L is determined by using Expression 4 indicated below.

$$L=\Sigma_{i=1}^{n-1} \int_{t_i}^{t_{i+1}} \sqrt{1+(S'(t))^2} \, dt \quad \text{Expression 4}$$

The shape setting unit 14 executes the shape control and the length adjustment in repetition cycles by using the via-point position Pi of the via point pi input to the input unit 2 and the initial position Q of the adjustment via point q input to the input unit 2 as an initial value until a difference between the actual length Lr of the guide cable GC as an example of the linear member and the length L of the guide cable GC determined by the length adjustment function 13 becomes smaller than or equal to a permissible value Th. The permissible value Th is set to an appropriate value, such as 7 [mm], 5 [mm], or 3 [mm], by taking into account, for example, the actual length Lr of the guide cable GC.

In this embodiment, when the shape control is to be executed in repetition cycles for determining the shape of the guide cable GC, the shape setting unit 14 changes (i.e., updates) the adjustment parameter. More specifically, the shape setting unit 14 changes the adjustment-via-point position Q to a position shifted in the movement direction Um by the movement amount ΔM corresponding to one cycle.

Then, in this embodiment, when the shape control is to be executed, the shape setting unit 14 changes the end-point position Pe of the guide cable CC in a predetermined changing direction by a predetermined change amount Δz within a predetermined range if the length L of the guide cable GC determined by the length adjustment function 13 is greater than the actual length Lr of the guide cable GC. The predetermined changing direction is a direction in which the moving device MD can positionally move the second end of the guide cable GC, and is the −z direction in the example shown in FIG. 1B. The predetermined range is a range in which the moving device MD can change the position of the second end of the guide cable GC, and ranges from z0 to z1 in the example shown in FIG. 1B. In this embodiment, the predetermined change amount Δz is, for example, a change amount Δz corresponding to one cycle in the repetition cycles of the shape control and the length adjustment for determining the shape of the guide cable GC. The change amount Δz corresponding to one cycle is preliminarily set to an appropriate value.

The control processor 1, the input unit 2, the display unit 3, the IF unit 4, and the storage unit 5 are configurable by, for example, a desktop-type or notebook-type computer. For example, the computer serving as these units 1 to 5 may be disposed in an operation room in a welding factory, may be incorporated in a console (i.e., may also function as a console), or may be provided separately from a console.

Figure 6:
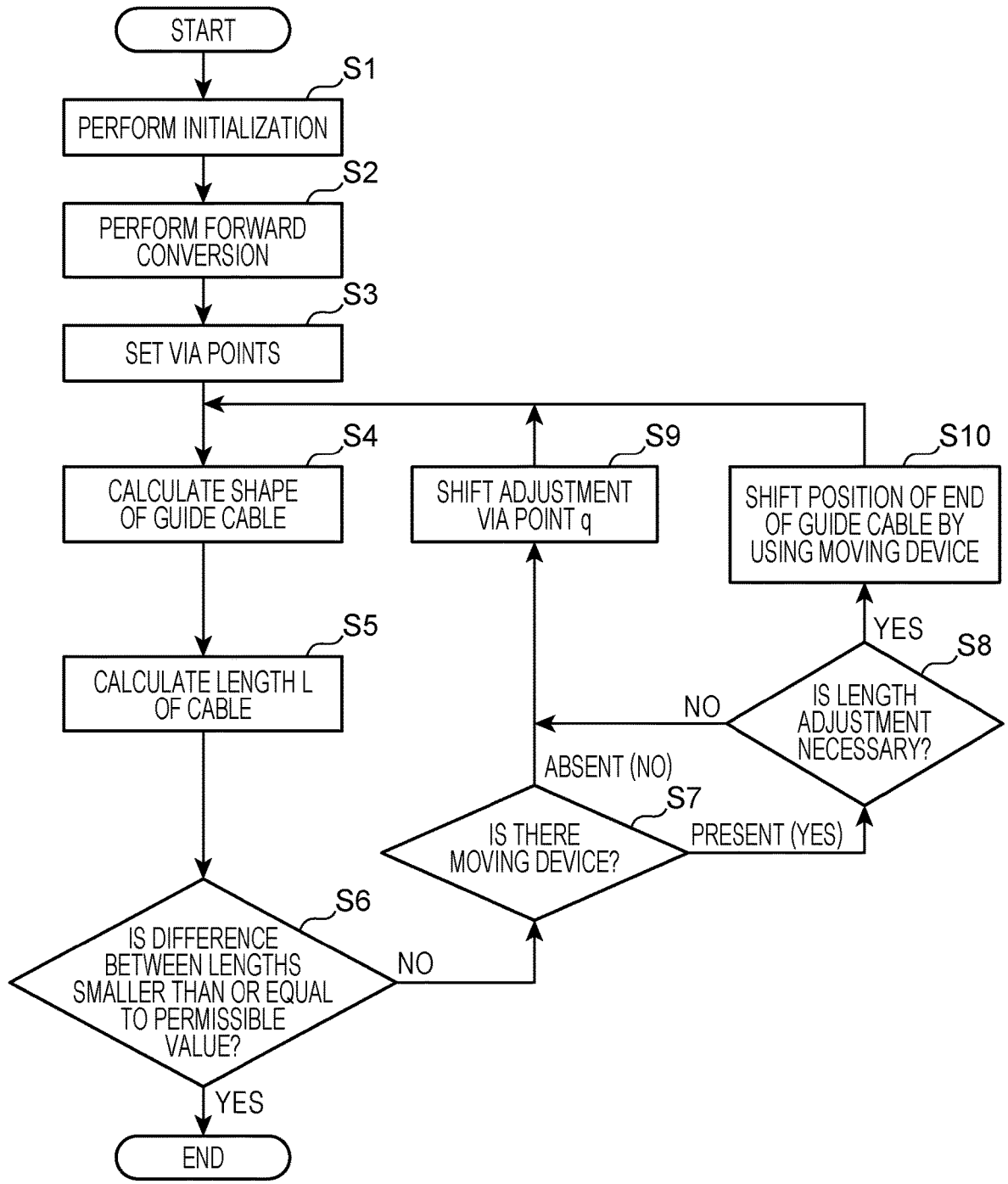
FIG. 6 is a flowchart illustrating the operation of the multi-joint-robot linear-member-shape simulator.

Next, the operation according to this embodiment will be described. FIG. 6 is a flowchart illustrating the operation of the multi-joint-robot linear-member-shape simulator.

When the power of the multi-joint-robot linear-member-shape simulator D (offline teaching device TC) having such a configuration is turned on, the linear-member-shape simulator D (offline teaching device TC) initializes required components and starts its operation. In the control processor 1, the control processing program thereof is executed so that the control unit 11, the shape control function 12, the length adjustment function 13, and the shape setting unit 14 are functionally implemented.

In FIG. 6, the linear-member shape setting process first involves the linear-member-shape simulator D (offline teaching device TC) performing initialization in step S1. The initialization involves an operator (user) using the input unit 2 to input the start-point position Ps, the start-point vector Vs, the end-point position Pe, the end-point vector Ve, the actual length Lr of the guide cable GC, and information indicating whether the moving device MD is present or absent (i.e., present in the example shown in FIG. 1B and absent in the example shown in FIG. 1C) with respect to the guide cable CC when the multi-joint robot MR is in the first posture. In this embodiment, for example, information indicating that the moving device MD is present is input.

Accordingly, the linear-member-shape simulator D receives these inputs from the input unit 2 and stores them in the storage unit 5. In the case where the moving device MD is present, the operator uses the input unit 2 to further input the changing direction (−z direction in the example shown in FIG. 1B), the change amount Δz corresponding to one cycle in repetition cycles for determining the shape of the guide cable GC, and the range thereof (z0 to z1 in the example shown in FIG. 1B). Accordingly, the linear-member-shape simulator D receives these inputs from the input unit 2 and stores them in the storage unit 5. The permissible value Th may be input and stored in the initialization performed in step S1, or may be stored in advance (i.e., may be preliminarily incorporated in the program).

Subsequently, in step S2, the linear-member-shape simulator D causes the shape control function 12 of the control processor 1 to determine the start-point position Ps, the start-point vector Vs, the end-point position Pe, and the end-point vector Ve of the guide cable GC by forward conversion after the multi-joint robot MR has moved from the first posture to the subsequent predetermined second posture based on the operation data.

Then, in step S3, the linear-member-shape simulator D sets the via points pi and q. The operator uses the input unit 2 to input the via-point position Pi, a via-point vector Vi, the initial position of the adjustment-via-point position Q, the adjustment-via-point vector U, the movement amount ΔM corresponding to one cycle in the repetition cycles for determining the shape of the guide cable GC, and the movement direction Um. Accordingly, the linear-member-shape simulator D receives these inputs from the input unit 2 and stores them in the storage unit 5.

As shown in FIG. 4, if the guide cable GC is twisted around the arm AM, the via point pi at which the guide cable GC is twisted around the arm AM of the multi-joint robot MR is set, and the via-point position Pi of the via point pi is input. The movement direction Um may be directly input, but in this embodiment, the curl vector Vh indicating the direction in which the guide cable GC curls is indirectly input, as described above with reference to FIGS. 5A and 5B. The control processor 1 determines a composite vector of the curl vector Vh and the gravitational-force vector Vg, and sets the direction of this composite vector as the movement direction Um.

Subsequently, in step S4, the linear-member-shape simulator D causes the shape control function 12 to perform shape control for determining the shape of the guide cable GC based on the start-point position Ps, the start-point vector Vs, the end-point position Pe, the end-point vector Ve, the via-point position Pi, the via-point vector Vi, the adjustment-via-point position Q, and the adjustment-via-point vector U. In this embodiment, the coefficients $A_i$, $B_i$, $C_i$, and $D_i$ are determined in accordance with the boundary condition, whereby the spline curve $S_i(t)$ expressing the shape of the guide cable GC is determined.

Then, in step S5, the linear-member-shape simulator D causes the length adjustment function 13 of the control processor 1 to perform a length adjustment for determining the length L when the guide cable GC has the shape determined by the shape control function 12.

Subsequently, in step S6, the linear-member-shape simulator D causes the shape setting unit 14 of the control processor 1 to determine whether or not a difference between the actual length Lr of the guide cable GC and the length L of the guide cable GC determined by the length adjustment function 13 in step S5 is smaller than or equal to the permissible value Th. If the determination result indicates that the difference is not smaller than or equal to the permissible value Th (i.e., "No" if the difference exceeds the permissible value Th), the linear-member-shape simulator D subsequently executes step S7. In contrast, if the difference is smaller than or equal to the permissible value Th (i.e., "Yes"), the linear-member-shape simulator D (offline teaching device TC) ends the process and displays the guide cable GC having the determined shape on the virtual robot model in the virtual space displayed on the display unit 3.

In step S7 mentioned above, the linear-member-shape simulator D causes the shape setting unit 14 of the control processor 1 to determine whether the moving device MD is present or absent. If the determination result indicates that the moving device MD is present (i.e., "Yes" if present), the linear-member-shape simulator D subsequently executes step S8. If the determination result indicates that the moving device MD is absent (i.e., "No" if absent), the linear-member-shape simulator D subsequently executes step S9.

In step S8, the linear-member-shape simulator D causes the shape setting unit 14 to determine whether or not a length adjustment is necessary. More specifically, the shape setting unit 14 compares the actual length Lr of the guide cable GC with the length L of the guide cable GC determined by the length adjustment function 13 in step S5. If the comparison result indicates that the length L of the guide cable GC determined by the length adjustment function 13 in step S5 is greater than the actual length Lr of the guide cable GC, it is determined that an adjustment is necessary (i.e., "Yes"), and the linear-member-shape simulator D subsequently executes step S10. In contrast, if the comparison result indicates that the length L of the guide cable CC determined by the length adjustment function 13 in step S5 is not greater than the actual length Lr of the guide cable GC (i.e., if the length L of the guide cable GC determined by the length adjustment function 13 in step S5 is smaller than the actual length Lr of the guide cable GC), it is determined that an adjustment is not necessary (i.e., "No"), and the linear-member-shape simulator D subsequently executes step S9.

In step S9 mentioned above, the linear-member-shape simulator D causes the shape setting unit 14 to change the adjustment-via-point position Q to a position shifted in the movement direction Um by the movement amount ΔM corresponding to one cycle, and subsequently executes step S4 (i.e., returns to step S4).

In step S10 mentioned above, the linear-member-shape simulator D causes the shape setting unit 14 to change the end-point position Pe of the guide cable GC to a position shifted in the changing direction (−z direction in the example shown in FIG. 1B) by the change amount Δz corresponding to one cycle, and subsequently executes step S4 (i.e., returns to step S4).

If the number of repetition cycles for determining the shape of the guide cable GC reaches a predetermined value set in advance, the repetition may be forcibly terminated, and a message indicating that the shape of the guide cable GC is not determinable may be displayed on the display unit 3. With this display, the above-described steps shown in FIG. 6 may be newly started, and, in step S3, the operator may set the via point pi and the adjustment via point q that are different from those in the previous cycle.

As described above, in the multi-joint-robot linear-member-shape simulator D according to the embodiment, as well as a multi-joint-robot linear-member-shape simulation method and a multi-joint-robot linear-member-shape simulation program that are implemented in the multi-joint-robot linear-member-shape simulator D, one or more via points pi via which a linear member extends can be set between the start-point position Ps and the end-point position Pe of the guide cable GC as an example of the linear member, so that a linear member with a more complex shape, such as a twisted shape, can be expressed. Therefore, with the above-described multi-joint-robot linear-member-shape simulator D, the multi-joint-robot linear-member-shape simulation method, and the multi-joint-robot linear-member-shape simulation program, the shape of the linear member can be determined based on an approximate curve even if the linear member has a more complex shape.

Because the above-described multi-joint-robot linear-member-shape simulator D, the multi-joint-robot linear-member-shape simulation method, and the multi-joint-robot linear-member-shape simulation program have the movement amount ΔM corresponding to one cycle in the repetition cycles and the movement direction Um as adjustment parameters, for example, a linear member with a bent shape can be expressed in view of curling of the linear member. Therefore, with the above-described multi-joint-robot linear-member-shape simulator D, the multi-joint-robot linear-member-shape simulation method, and the multi-joint-robot linear-member-shape simulation program, the shape of a linear member can be determined based on an approximate curve in view of, for example, bonding caused by curling of the linear member.

In the above-described multi-joint-robot linear-member-shape simulator D, the multi-joint-robot linear-member-shape simulation method, and the multi-joint-robot linear-member-shape simulation program, when shape control is to be executed, the end-point position Pe of the guide cable GC as an example of a linear member is changed, so that the shape of the linear member can be determined based on an approximate curve in view of, for example, a device (equipment), such as a tool balancer, for adjusting the end-point position Pe of the guide cable GC.

This embodiment can provide a multi-joint-robot linear-member-shape simulator D, a multi-joint-robot linear-member-shape simulation method, and a multi-joint-robot linear-member-shape simulation program that can determine the shape of a linear member twisted around the arm AM of the multi-joint robot MR based on an approximate curve.

In the above embodiment, the shape control function 12 determines the shape of a linear member based on the start-point position Ps, the vector Vs at the start-point position Ps, the end-point position Pe, the vector Ve at the end-point position Pe, the position Pi of the via point pi, the vector Vi at the position Pi of the via point pi, the position Q of the adjustment via point q, and the vector U at the position Q of the adjustment via point q. Accordingly, by adjusting the magnitude of the vectors, the shape of a linear member can be determined based on an approximate curve in view of the rigidity of the linear member.

Figure 7A:
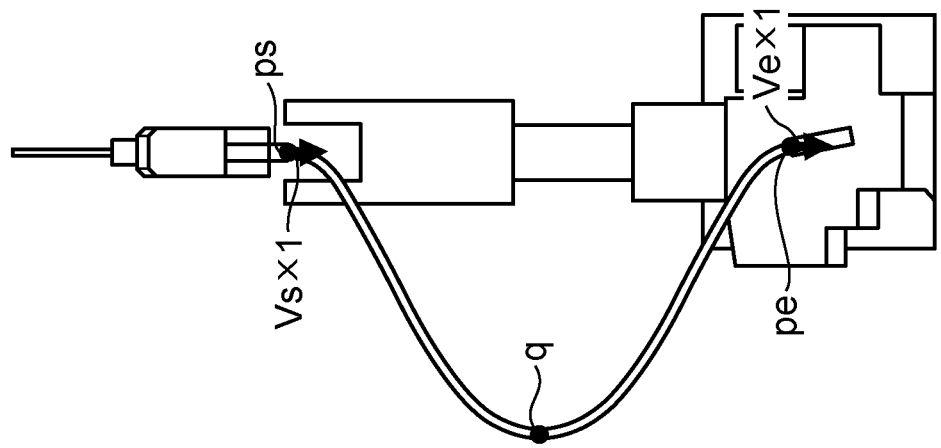
FIGS. 7A to 7C each illustrate a simulation result obtained in accordance with a modification.
Figure 7B:
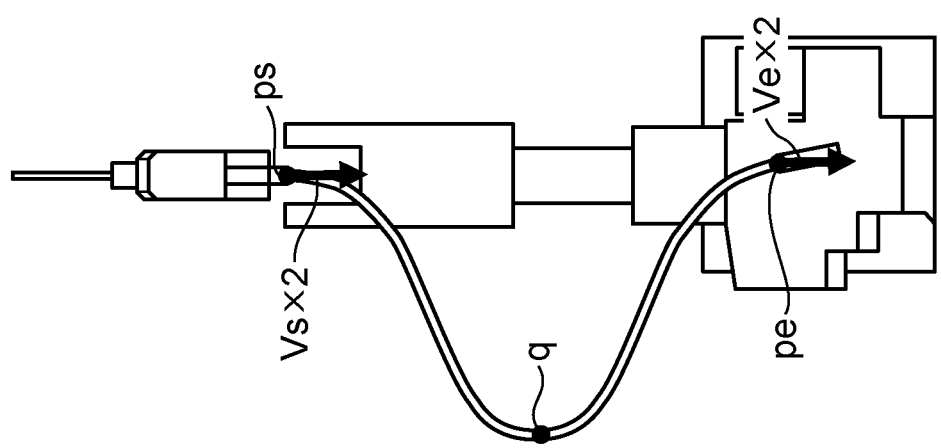
Figure 7C:
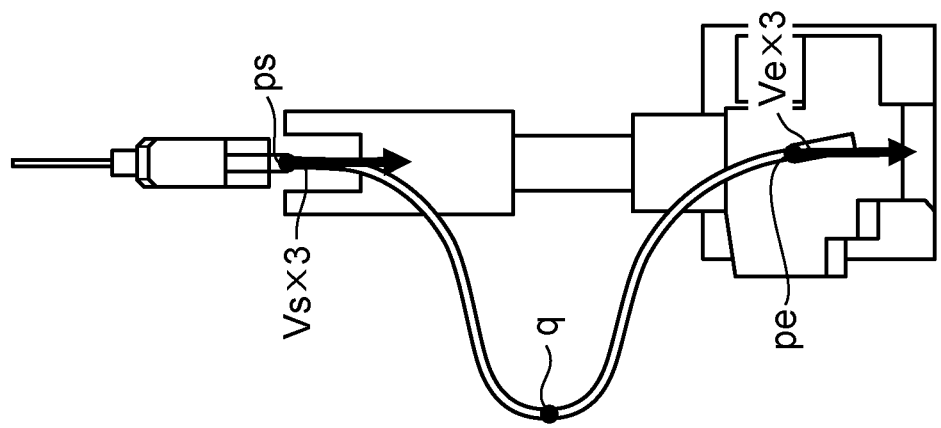

In detail, in the above example, the shape of a linear member is determined in accordance with Expression 1 to Expression 3, and the rigidity of the linear member can be expressed by adjusting the weight $w_i$ of each vector in Expression 3. FIGS. 7A to 7C each illustrate a simulation result obtained by adjusting the weight Ws and the weight We with respect to the start point ps and the end point pe, respectively.

FIGS. 7A to 7C each illustrate a simulation result obtained in accordance with a modification. FIG. 7A illustrates a result obtained in a case where Ws=We=1, FIG. 7B illustrates a result obtained in a case where Ws=We=2, and FIG. 7C illustrates a result obtained in a case where Ws=We=3. The weight $w_i$ with respect to the adjustment via point q in each of FIGS. 7A to 7C is 1.

By comparing FIGS. 7A to 7C, it is apparent that the guide cable GC becomes less likely to bend from the direction of the vectors Vs and Ve at the start point ps and the end point pe as the weight Ws and the weight We with respect to the start point ps and the end point pe increase. Thus, the rigidity at the start and end points of the guide cable GC can be expressed with the weight Ws and the weight We with respect to the start point ps and the end point pe.

Furthermore, by adjusting the weight $w_i$ of each vector at the via point pi or the adjustment via point q set when the guide cable GC with a more complex shape, such as a twisted shape, is to be expressed, the rigidity of the guide cable GC at points other than the start and end points can be expressed.

Although the present invention has boon appropriately and sufficiently described above with reference to the drawings and the embodiment to express the present invention, it should be noted that a skilled person may readily modify or alter the above embodiment. Therefore, it is to be interpreted that a modification or an alteration implemented by a skilled person is included in the scope of the claims so long as the modification or the alteration does not deviate from the scope defined in the claims.

What is claimed is:

1. A multi-joint-robot linear-member-shape simulator that determines a shape of a linear member attached to a multi-joint robot when the multi-joint robot is in a predetermined posture, the multi-joint-robot linear-member-shape simulator comprising:
    an input unit that receives a position of at least one via point via which the linear member extends between a start-point position and an end-point position of the linear member, an initial position of an adjustment via point via which the linear member extends and that adjusts a length of the linear member, and an adjustment parameter of the adjustment via point;
    a shape control function that executes shape control for determining the shape of the linear member;
    a length adjustment function that executes a length adjustment for determining the length of the linear member when the linear member has the shape determined by the shape control function;
    a shape setting unit that executes the shape control and the length adjustment in repetition cycles by using the position of the via point input to the input unit and the initial position of the adjustment via point input to the input unit as an initial value until a difference between an actual length of the linear member and the length of the linear member determined by the length adjustment function becomes smaller than or equal to a permissible value, wherein the shape setting unit changes the adjustment parameter when the shape control is to be executed, and
    a control unit configured to
        create operation data comprising an operation program for moving the multi-joint robot based upon the determined shape of the linear member;
        store the operation data in a memory connected to the control unit; and
        read the stored operation data and execute the operation program to move the multi-joint robot.

2. A multi-joint-robot linear-member-shape simulation method for determining a shape of a linear member attached to a multi-joint robot when the multi-joint robot is in a predetermined posture, the method comprising:
    an input step for receiving a position of at least one via point via which the linear member extends between a start-point position and an end-point position of the linear member, an initial position of an adjustment via point via which the linear member extends and that adjusts a length of the linear member, and an adjustment parameter of the adjustment via point;
    a shape control step for determining the shape of the linear member;
    a length adjustment step for determining the length of the linear member when the linear member has the shape determined in the shape control step;
    a shape setting step for executing the shape control step and the length adjustment step in repetition cycles by using the position of the via point input in the input step and the initial position of the adjustment via point input in the input step as an initial value until a difference between an actual length of the linear member and the length of the linear member determined in the length adjustment step becomes smaller than or equal to a permissible value,
    wherein the shape setting step includes changing the adjustment parameter when the shape control step is to be executed,
    a control step for creating operation data comprising an operation program for moving the multi-joint robot based upon the determined shape of the linear member, storing the operation data in a memory; and
    reading the stored operation data and executing the operation program to move the multi-joint robot.

3. A non-transitory computer-readable medium storing a multi-joint-robot linear-member-shape simulation program for determining a shape of a linear member attached to a multi-joint robot when the multi-joint robot is in a predetermined posture, the program, when executed, causing a computer to perform a process comprising:
    an input step for receiving a position of at least one via point via which the linear member extends between a start-point position and an end-point position of the linear member, an initial position of an adjustment via point via which the linear member extends and that adjusts a length of the linear member, and an adjustment parameter of the adjustment via point;
    a shape control step for determining the shape of the linear member;
    a length adjustment step for determining the length of the linear member when the linear member has the shape determined in the shape control step;
    a shape setting step for executing the shape control step and the length adjustment step in repetition cycles by using the position of the via point input in the input step and the initial position of the adjustment via point input in the input step as an initial value until a difference between an actual length of the linear member and the length of the linear member determined in the length adjustment step becomes smaller than or equal to a permissible value,
    wherein the shape setting step includes changing the adjustment parameter when the shape control step is to be executed,
    a control step for creating operation data comprising an operation program for moving the multi-joint robot based upon the determined shape of the linear member, create operation data for moving the multi-joint robot based upon the determined shape of the linear member, storing the operation data in a memory, and
    reading the stored operation data and executing the operation program to move the multi-joint robot.

4. The multi-joint-robot linear-member-shape simulator according to claim 1, wherein the adjustment parameter includes a movement amount corresponding to one cycle in the repetition cycles and a movement direction.

5. The multi-joint-robot linear-member-shape simulator according to claim 4,
wherein the via point includes a point at which the linear member is twisted around an arm of the multi-joint robot.

6. The multi-joint-robot linear-member-shape simulator according to claim 4,
wherein the shape setting unit changes the end-point position of the linear member if the length of the linear member determined by the length adjustment function is greater than the actual length of the linear member.

7. The multi-joint-robot linear-member-shape simulator according to claim 4,
wherein the shape control function determines the shape of the linear member based on the start-point position, a vector at the start-point position, the end-point position, a vector at the end-point position, a position of the via point, a vector at the position of the via point, a position of the adjustment via point, and a vector at the position of the adjustment via point.

8. The multi-joint-robot linear-member-shape simulator according to claim 4,
wherein the via point includes a point at which the linear member is twisted around an arm of the multi-joint robot, and
wherein the shape setting unit changes the end-point position of the linear member if the length of the linear member determined by the length adjustment function is greater than the actual length of the linear member.

9. The multi-joint-robot linear-member-shape simulator according to claim 4,
wherein the via point includes a point at which the linear member is twisted around an arm of the multi-joint robot, and
wherein the shape control function determines the shape of the linear member based on the start-point position, a vector at the start-point position, the end-point position, a vector at the end-point position, a position of the via point, a vector at the position of the via point, a position of the adjustment via point, and a vector at the position of the adjustment via point.

10. The multi-joint-robot linear-member-shape simulator according to claim 4,
wherein the shape setting unit changes the end-point position of the linear member if the length of the linear member determined by the length adjustment function is greater than the actual length of the linear member, and
wherein the shape control function determines the shape of the linear member based on the start-point position, a vector at the start-point position, the end-point position, a vector at the end-point position, a position of the via point, a vector at the position of the via point, a position of the adjustment via point, and a vector at the position of the adjustment via point.

11. The multi-joint-robot linear-member-shape simulator according to claim 4,
wherein the via point includes a point at which the linear member is twisted around an arm of the multi-joint robot,
wherein the shape setting unit changes the end-point position of the linear member if the length of the linear member determined by the length adjustment function is greater than the actual length of the linear member, and
wherein the shape control function determines the shape of the linear member based on the start-point position, a vector at the start-point position, the end-point position, a vector at the end-point position, a position of the via point, a vector at the position of the via point, a position of the adjustment via point, and a vector at the position of the adjustment via point.

12. The multi-joint-robot linear-member-shape simulator according to claim 1,
wherein the via point includes a point at which the linear member is twisted around an arm of the multi-joint robot.

13. The multi-joint-robot linear-member-shape simulator according to claim 1,
wherein the shape setting unit changes the end-point position of the linear member if the length of the linear member determined by the length adjustment function is greater than the actual length of the linear member.

14. The multi-joint-robot linear-member-shape simulator according to claim 1,
wherein the shape control function determines the shape of the linear member based on the start-point position, a vector at the start-point position, the end-point position, a vector at the end-point position, a position of the via point, a vector at the position of the via point, a position of the adjustment via point, and a vector at the position of the adjustment via point.

15. The multi-joint-robot linear-member-shape simulator according to claim 1,
wherein the via point includes a point at which the linear member is twisted around an arm of the multi-joint robot, and
wherein the shape setting unit changes the end-point position of the linear member if the length of the linear member determined by the length adjustment function is greater than the actual length of the linear member.

16. The multi-joint-robot linear-member-shape simulator according to claim 1,
wherein the via point includes a point at which the linear member is twisted around an arm of the multi-joint robot, and
wherein the shape control function determines the shape of the linear member based on the start-point position, a vector at the start-point position, the end-point position, a vector at the end-point position, a position of the via point, a vector at the position of the via point, a position of the adjustment via point, and a vector at the position of the adjustment via point.

17. The multi-joint-robot linear-member-shape simulator according to claim 1,
wherein the shape setting unit changes the end-point position of the linear member if the length of the linear member determined by the length adjustment function is greater than the actual length of the linear member, and
wherein the shape control function determines the shape of the linear member based on the start-point position, a vector at the start-point position, the end-point position, a vector at the end-point position, a position of the via point, a vector at the position of the via point, a position of the adjustment via point, and a vector at the position of the adjustment via point.

18. The multi-joint-robot linear-member-shape simulator according to claim 1, wherein the via point includes a point at which the linear member is twisted around an arm of the multi-joint robot, wherein the shape setting unit changes the end-point position of the linear member if the length of the linear member determined by the length adjustment function is greater than the actual length of the linear member, and wherein the shape control function determines the shape of the linear member based on the start-point position, a vector at the start-point position, the end-point position, a vector at the end-point position, a position of the via point, a vector at the position of the via point, a position of the adjustment via point, and a vector at the position of the adjustment via point.

19. The multi-joint-robot linear-member-shape simulator according to claim 1, wherein the control unit creates operational data changing an end-point of the linear member on the multi-joint robot.

20. The multi-joint-robot linear-member-shape simulator according to claim 1, wherein the control unit executes the operation program to move the multi-joint robot from a first posture to a second posture; and the shape setting unit executes shape control after the multi-joint robot is moved.

* * * * *